Jan. 13, 1948.   J. V. GOLDEN ET AL   2,434,316
FRANKFURTER SKINNING MACHINE
Filed Feb. 23, 1942   2 Sheets-Sheet 1
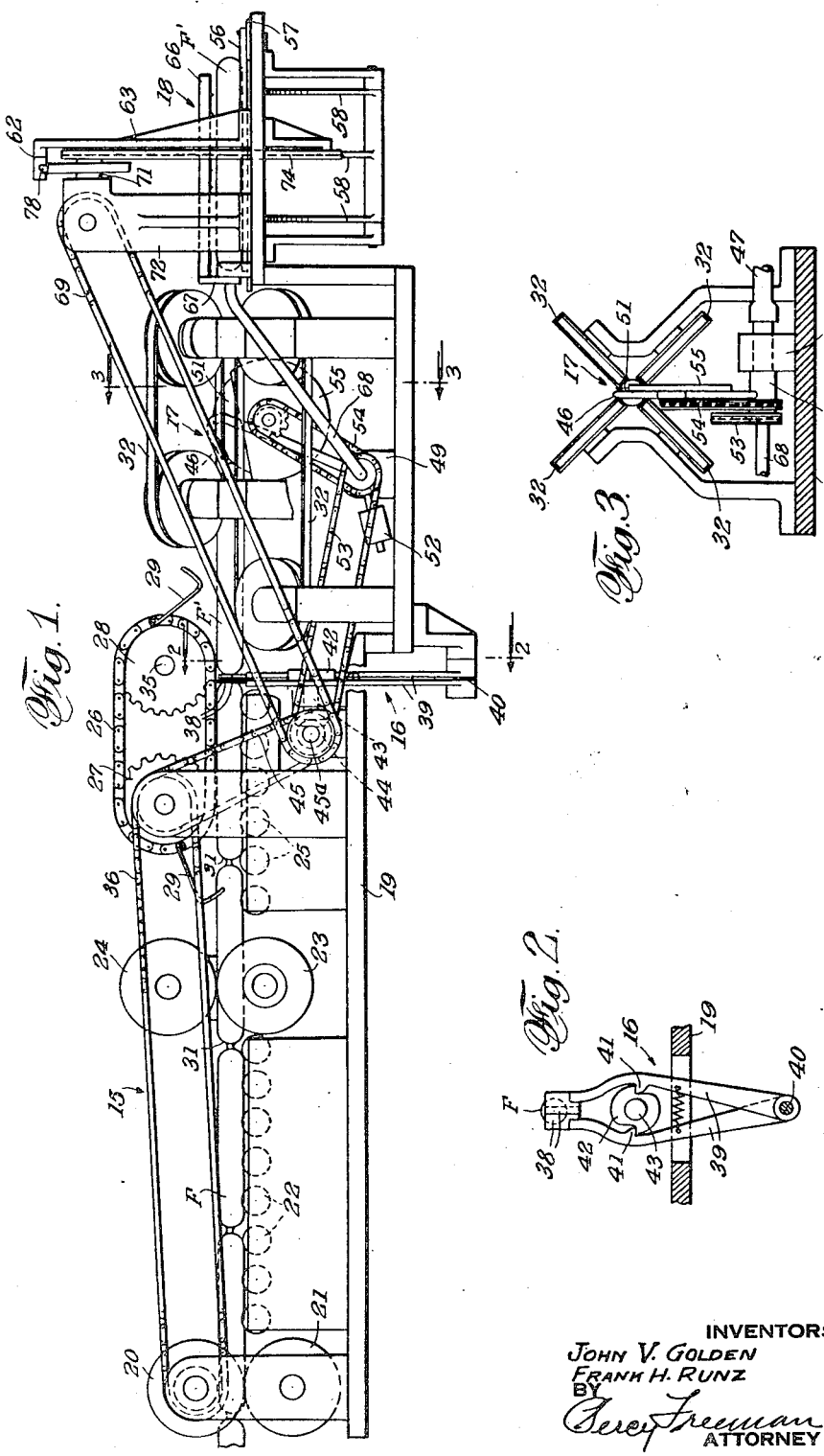
INVENTORS
JOHN V. GOLDEN
FRANK H. RUNZ
BY
ATTORNEY Jan. 13, 1948.   J. V. GOLDEN ET AL   2,434,316
FRANKFURTER SKINNING MACHINE
Filed Feb. 23, 1942   2 Sheets-Sheet 2
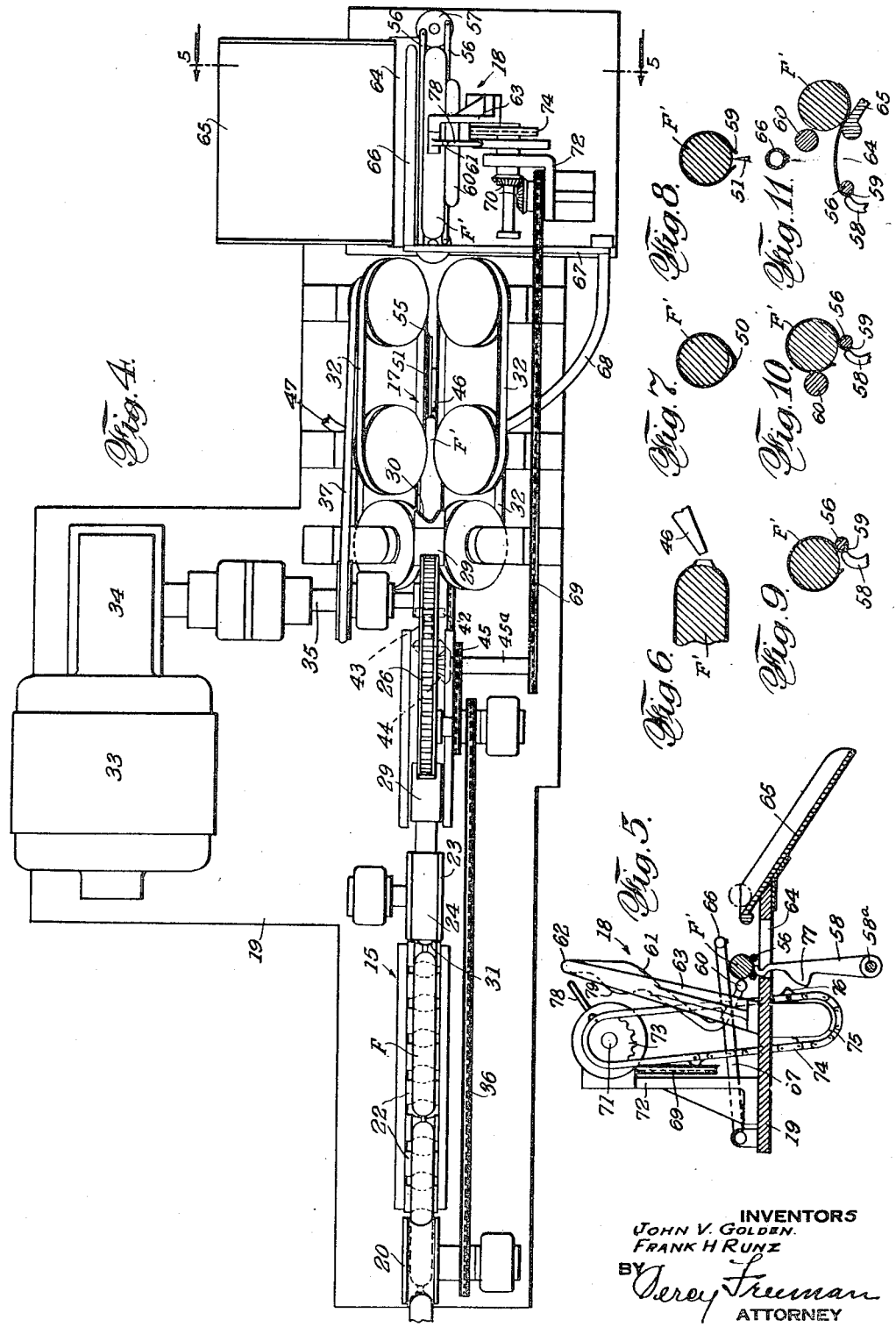
INVENTORS
JOHN V. GOLDEN.
FRANK H RUNZ
BY
*Percy Freeman*
ATTORNEY Patented Jan. 13, 1948

2,434,316

UNITED STATES PATENT OFFICE 2,434,316

FRANKFURTER SKINNING MACHINE

John V. Golden, Stamford, Conn., and Frank H. Runz, New York, N. Y.

Application February 23, 1942, Serial No. 431,980

14 Claims. (Cl. 17—1)

This invention relates to machines for removing the casing or skin of frankfurters whereby "skinless" frankfurters are obtained.

At the present time, "skinless" frankfurters are made by first forming the usual type of linked frankfurter, using a cellulose casing, then parboiling, and finally removing the skin or casing by hand. The manual handling of the frankfurters during peeling, renders them somewhat costly and not suitable for use by certain consumers.

The invention, therefore, has for its primary object to provide a machine for effecting the automatic removal of the casings of frankfurters, sausages, and the like.

Another object is to provide a novel frankfurter skinning method in which manual handling is obviated.

The foregoing general objects and other objects, features, and advantages are attained in the apparatus illustrated in the accompanying drawings which show a machine for the purpose as at present conceived. The invention, as based on the drawings, is described in detail in the following specification.

In the drawings:

Fig. 1 is a side elevational view of a frankfurter skinning or peeling machine incorporating features of the invention.

Figs. 2 and 3 are transverse detail sectional views as taken on the respective lines 2—2 and 3—3 of Fig. 1.

Fig. 4 is a plan view of the machine shown in Fig. 1.

Fig. 5 is a cross-sectional view as taken on the line 5—5 of Fig. 4.

Figs. 6 to 11 inclusive, are detail sectional fragmentary views illustrating the steps of the present method.

The present machine is designed to peel linked frankfurters especially made for peeling by being stuffed in special cellulosic casings not intended to be eaten. These casings differ from the usual viscose in that they are somewhat thicker and slightly stretchable.

Referring to the drawings in greater detail, the present machine comprises frankfurter feeding means 15, severing means 16, blister forming and casing slitting means 17, and peeling means 18. These general means are preferably arranged upon a base or frame 19 which may be supported upon a table or leg (not shown).

The feeding means 15 may comprise an initial feed wheel 20 cooperating with an idler roller 21 to feed linked frankfurters F along a series of support rolls 22. The frankfurters move between idler wheels 23 and 24 onto another set of support rolls 25. The wheels 20 and 23 may be provided with one-way clutch means whereby they may turn only in the direction of feed of the frankfurters.

Cooperating with the rolls 25, there is provided a conveyor comprising a chain 26 trained about sprockets 27 and 28, and having one or more grippers 29. The latter are formed with notched portions 30 which are designed to engage the trailing end of each of the linked frankfurters as at 31 and thus propel them toward the right as seen in the drawings.

Further feed means include four bands 32 arranged in pairs, as best seen in Fig. 3, to move the frankfurters further to the right after losing contact with the grippers 29.

The drive for the feeding means is initiated in an electric motor 33 having a speed reducer 34 which drives a shaft 35 connected with the sprocket 28. The wheel 23 is an idler and therefore, not driven, but the wheel 20 is driven as by a chain 36 off the shaft of the sprocket 27. One or more of the bands 32 may be driven as by means of a belt 37 off the drive shaft 35.

The mechanism is so arranged as to cause the linked frankfurters to be moved whereby the links therebetween are presented to the severing means 16. The grippers 29 serve as intermittent feeding means affording a period of rest for the frankfurters while they are being severed.

The severing means comprises a pair of knife cutters 38 mounted on arms 39 carried on a stud 40. Each of the arms 39 is provided with a lug 41 engaged by a cam 42, suitably notched and mounted on a stub shaft 43. The cam is driven by means such as the bevel gears 44 and chain 45 from the shaft of the sprocket 27 in timed relation and during the rest period of the frankfurters to cause the knives 38 to sever the link therebetween.

A severed frankfurter, such as shown at F' is now presented to the blister forming and casing slitting means 17. This means comprises an air nozzle 46 which receives air from an outside source as by means of a tube 47 and a hollow shaft 48 journaled at 49. The nozzzle 46 is so presented to the end of the frankfurter F" (Fig. 6) as to direct a stream of air between the body of the frankfurter and the lower portion of its casing to form a blister 50 as shown in Fig. 7. Mounted with the nozzle 46 there is provided a rotary cutter or splitting wheel 51 which, together with the nozzle, is counterweighted as at 52, to seek contact with the oncoming frankfurter but to yield thereto as can be understood. Thus, as the frankfurter is fed by the bands 32, its blister 50 is slit by the cutter 51 as shown in Fig. 8.

Means are provided to rotate the cutter 51. As shown, this means may comprise a chain 53 driven from the shaft 45ᵃ to drive a second chain 54 trained between the hollow shaft 48 and the cutter shaft. The cutter may be suitably enclosed in a guard 55.

After slitting thereof, the frankfurter is propelled by the bands 32 onto a pair of adjustable ways 56 which may be set as regards the distance between them by rotational adjustment of a disc 57. This adjustment is made in accordance with the diameter of the frankfurters.

As a frankfurter comes to rest upon the ways 56, one or more clamp levers 58, mounted on a shaft 58ᵃ, are moved to clamp one of the cut edges 59 of a casing against one of the ways 56, as best seen in Fig. 9. Then, means such as the bar 60 carried by an arm 61, and pivoted at 62 on a bracket 63, is moved to engage the frankfurter longitudinally and to displace the same transversely from its position on the ways 56. Fig. 10 shows this condition.

Inasmuch as the casing edge 59 is clamped, the action of the bar 60 causes the frankfurter to roll out of its casing across the opening or gap 64 and onto a discharge chute 65 (Fig. 11). As the casing is freed of the skinned frankfurter, which rolls down the chute to packing means, the clamp lever is also freed to release said casing, which may either drop through the opening 64, be mechanically pushed therethrough, drawn therethrough as by suction means, or, as shown, blown therethrough by air from a perforated tube 66 carried on a hollow arm 67 and supp'ed by a tube 68 connected with the hollow shaft 48.

The peeling means 18 above described, may be driven from the shaft 43 by a chain 69 which, through gearing 70, drives the shaft 71 on a bracket 72. This latter shaft carries a sprocket 73 for a chain 74 trained about a sprocket 75. The chain 74 is provided with suitably spaced lugs 76 to time their engagement with a cam portion 77 on one of the clamp levers 58. By this means, said clamp levers are operated.

The shaft 71 also carries means for effecting movement of the bar 60. This means may be in the form of a cam or pin 78 designed to engage the arm 61 at 79, as can be understood.

It should be realized that the particular mechanism disclosed may be varied in many ways within the inventive concept. Hence, no limitation as regards the spirit and scope of the appended claims is intended by the terms employed herein.

What is claimed as new and desired to secure by Letters Patent, is:

1. A frankfurter skinning machine comprising means for feeding linked frankfurters, means for severing said frankfurters, means for longitudinally slitting the casing of the severed frankfurters, and means for removing the body thereof from the casing.

2. A frankfurter skinning machine comprising means for feeding linked frankfurters, means for severing said frankfurters, means for forming a longitudinal blister in the casing of each severed frankfurter, means for slitting said casing along said blister, and means for removing the body thereof from said slitted casing.

3. A frankfurter skinning machine comprising means for feeding linked frankfurters, means for severing said frankfurters, means for longitudinally slitting the casing of the severed frankfurters, and means for removing the body thereof from the casing, said latter means comprising means for clamping one severed edge of said casing and means for transversely displacing the frankfurter body while the casing is clamped.

4. A frankfurter skinning machine comprising means for feeding linked frankfurters, means for severing said frankfurters, means for forming a longitudinal blister in the casing of each severed frankfurter, means for slitting said casing along said blister, and means for removing the body thereof from said slitted casing, said latter means comprising means for clamping one severed edge of said casing and means for transversely displacing the frankfurter body while the casing is clamped.

5. In a frankfurter skinning machine, means for forming a longitudinal blister in the casing of a frankfurter, and means for slitting said casing along said blister.

6. In a frankfurter skinning machine, an air nozzle for directing air between the body of a frankfurter and the casing thereof to form an air blister, and means for longitudinally slitting said casing along said blister.

7. In a frankfurter skinning machine, an air nozzle for directing air between the body of a frankfurter and the casing thereof to form an air blister, and means for longitudinally slitting said casing along said blister, said latter means comprising a rotary cutter.

8. In a frankfurter skinning machine, means for removing the body of a frankfurter after longitudinal slitting of the casing thereof comprising, means for clamping one edge of the slitted casing, and means for transversely displacing said frankfurter body from said clamped casing.

9. In a frankfurter skinning machine, means for removing the body of a frankfurter after longitudinal slitting of the casing thereof comprising, means for clamping one edge of the slitted casing, and means for transversely displacing said frankfurter body from said clamped casing, said casing clamping means comprising at least one clamp lever and a portion of the support means for said frankfurter.

10. In a frankfurter skinning machine, means for removing the body of a frankfurter after longitudinal slitting of the casing thereof comprising, means for clamping one edge of the slitted casing, and means for transversely displacing said frankfurter body from said clamped casing, said displacing means comprising a member arranged substantially parallel with the frankfurter, and means for moving said member to roll said frankfurter body from its clamped casing.

11. A machine according to claim 2, including means for ejecting the casing after removal of the body thereof.

12. A machine according to claim 2, including means for ejecting the casing after removal of the body thereof, said ejecting means comprising a member directing an air blast on said casing.

13. The method of skinning frankfurters which consists in first severing the end one of a string of linked frankfurters, then longitudinally slitting the casing of the severed frankfurter, then clamping one edge of the slitted casing, and finally rolling the body of the frankfurter out of its clamped casing.

14. The method of skinning frankfurters which consists in first severing the end one of a string of linked frankfurters, then longitudinally slitting the casing of the severed frankfurter, then clamping one edge of the slitted casing, then rolling the body of the frankfurter out of its clamped casing, and finally releasing the casing and blowing the same out of the path of oncoming frankfurters.

FRANK H. RUNZ.
JOHN V. GOLDEN.

REFERENCES CITED

The following references are of record in the file of this patent:

UNITED STATES PATENTS

| Number | Name | Date |
| --- | --- | --- |
| 2,340,755 | Jacobson | Feb. 1, 1944 |
| 1,994,468 | Freeman | Mar. 19, 1935 |
| 2,140,166 | Reeve | Dec. 13, 1938 |